United States Patent [19]

Redden

[11] Patent Number: 4,916,288

[45] Date of Patent: Apr. 10, 1990

[54] ELECTRICALLY HEATED HORSESHOEING TOOL

[76] Inventor: Ralph F. Redden, Box 507, Versailles, Ky. 40383

[21] Appl. No.: 371,321

[22] Filed: Jun. 26, 1989

[51] Int. Cl.$^4$ .............................................. H05B 1/00
[52] U.S. Cl. .................................. 219/228; 219/221; 219/227; 219/229; 168/45
[58] Field of Search ............... 219/221, 227, 228, 229; 168/2, 4, 44, 45; 119/1

[56] References Cited

U.S. PATENT DOCUMENTS

| | | | |
|---|---|---|---|
| 3,664,428 | 5/1972 | Spencer | 168/4 |
| 3,921,721 | 11/1975 | George | 163/4 |

Primary Examiner—Bruce A. Reynolds
Assistant Examiner—Leon K. Fuller
Attorney, Agent, or Firm—Robert W. Jenny

[57] ABSTRACT

The tool is electrically heated and has a flat working surface, essentially horseshoe shaped. The working surface is heated to between 500° F. and 900° F. and pressed for from 3 to 10 seconds against the ground contact surface of a horse's hoof prepared for shoeing. The contact sears the insensitive part of the hoof, the horn, to dry out the horn, seal off the capillary tubes in the tubular of the hoof and flatten any irregularities left on the surface during the preparation for shoeing. This treatment reduces the potential for hoof damage caused by moisture. The working surface is on the horseshoe shaped part which encloses an electrical heating element. The heating element is attached to a handle for the tool. In the steady state heated condition the heat radiated by the tool equals the heat produced by the heating element and no thermostatic temperature control is required.

2 Claims, 1 Drawing Sheet

ELECTRICALLY HEATED HORSESHOEING TOOL

BACKGROUND OF THE INVENTION

1. Field of the Invention

This invention is in the field of electrical heated appliances such as clothing irons, electrically heated tooling components and, more specifically, electrically heated branding irons.

2. Prior Art

There is no prior art known to the inventor of an electrically heated element made for application to a horse's hoof. The known related prior art patents, listed below, teaches horseshoes and related apparatus electrically heated for the purpose of curing adhesives and/or sealants but not for the purpose of treating the hoof. The patents are:

| | |
|---|---|
| 3,524,505 | 3,782,473 |
| 3,664,428 | 3,921,721 |

The subject tool is used on the non-sensitive portions of horses' hooves. The non-sensitive portion is the visible portion and is very similar in nature to fingernails of human beings. It grows at a steady rate and, with the demands often put on horses in recent times, the non-sensitive portions must be carefully maintained by farriers to assure the general health and proper shaping of horses' hooves. The outer layer of the non-sensitive portion of a hoof is termed the horn or horn wall. The care provided by the farrier includes trimming off excess growth of the horn, shaping the horn and attachment of horseshoes to it, if desired.

The outer portion of the horn comprises a network of small tubular structure, termed the tubular. The tubes in the tubular are parallel to the surface of the horn and run generally upward from the bottom or the wear surface of the hoof. The capillary action of these small diameter tubes causes them to function as efficient wicks so that the tubular absorbs and gives up moisture, depending on the osmotic gradients of the surfaces with which the hoof comes into contact. With considerable moisture absorbed the horn becomes very soft and pliable. When dry it is hard and very rigid. The dry, hard condition is most desirable since soft horn tends to break down, making it difficult to properly attach protective shoes. Further, the holes opened by the nails used in attaching horseshoes allow additional moisture to enter the horn, along with debris in some cases, aggravating the potential for deterioration of the horn.

The potential for damage to the hoof due to the natural wicking action and the use of nails is alleviated considerably when a horseshoe is seated to the foot while still hot, preferably at a temperature between 500° F. and 900° F. Iron shoes are solid and workable in this temperature range and experienced farriers are expert at judging the temperatures of the shoes. The hot metal melts a thin layer of the horn and effectively seals off the tubes in the tubular and holes made by the nails, thus preventing the entry of moisture and/or debris. Also the heat drives off moisture present in the horn prior to application of the shoe.

In more recent times a preponderance of horseshoes are factory made, can be shaped cold with various apparatus including the well-known hammer and anvil, and are applied cold for various reasons. Heating them adds costs of forges and fuels and is time consuming. Also many farriers in these times are not educated about or experienced with applying hot horseshoes. Also many factory made shoes are made of aluminum alloys which are not compatible with the forge work suitable for iron shoes.

It can be understood at this point that modern "cold shoeing" leaves hooves vulnerable to the deteriorating effects of moisture. The prime objective of the subject invention is provision of apparatus for ameliorating this vulnerability. Further objectives are that the apparatus be safe, economical to make and use and usable with minimum requirements for training in their proper use by qualified farriers.

SUMMARY OF THE INVENTION

The invention comprises an electrically heated metal part fitted with a handle. The preferred metal for this part is bronze because it is structurally sound in the working temperature range and is not subject to serious discoloration, scaling or corrosion because of being repeatedly heated and cooled. The part is shaped like a horseshoe but has proportions which make it suitable to completely cover the ground contact surface of a great majority of the feet of performance horses, i.e. racing, jumping, etc. One or two heating elements are encased in the part and serve as the structural interconnection between the part and the handle, thus separating the handle from the heated/cooled part. The heating elements are tubular heaters such as Calrods ® and their ends are secured in an aluminum alloy adapter. The electrical conductors of the heaters extend through the adaptor and the handle which is also attached to the adaptor. The conductors terminate in a standard 3 prong electrical connector suitable for the power requirements of the heater. The preferred voltage input is 110/115 V., alternating or direct current.

In use the hoof is prepared for attachment of the shoe by standard practice, with excess material removed and the ground contact surface made flat with conventional, accepted tools and techniques. Then, Just prior to the attachment of the horseshoe, the flat working surface of the apparatus, heated to between 500° and 900° F., is applied for 3 to 10 seconds to the ground contact surface of the hoof, maintaining even pressure all around. The hot metal sears the ground contact surface, sealing off the capillaries in the tubular and any previous nail holes and flattening the surface still more by burning back any irregularities left by the usual flattening techniques.

The invention is described in more detail below with reference to the attached drawings.

DETAILED DESCRIPTION OF THE INVENTION

Figure 1:
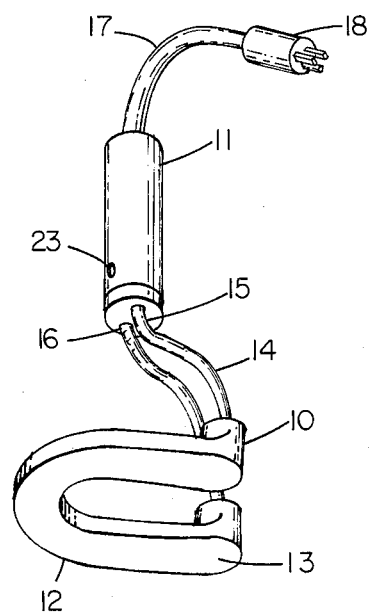
FIG. 1 is a perspective view of the subject tool.

Referring to FIG. 1, the subject invention is an electrically heated tool 10 comprising a hollow handle 11, a generally horseshoe shaped part 12 having a flat working surface 13, a heating element 14 encased in part 12 and having first and second ends 15 and 16 extending from it, a power cord 17 and power plug 18. Part 12 may be cast around the heating element or made of more than one part with the parts assembled to encase the heating element. In use the plug is inserted into a source of electrical power and the heater element raises the temperature of part 12 to 500° to 900° F. Under steady state conditions the energy supplied by the heater is equal to the heat energy radiated by part 12. Ambient conditions determine the resultant steady state temperature of part 12 in the stated temperature range and no automatic control of the temperature, such as by a thermo-static switch, is required. When a horse's hoof has been prepared for attachment of a shoe, working surface 13 is pressed against the ground contact surface of the hoof. The hot metal sears the insensitive portion of the hoof, sealing off the capillary tubes in the tubular of the hoof as well as any existing nail holes. The searing also flattens out any unevenness left in the ground contact surface during the preparation procedure. Also, the application of heat dries out any moisture in the tubular at the time of the application. The results of the application of the hot tool to the hoof and (1) significant reduction in the potential for damage to the horn portion of the hoof that might be caused by moisture and (2) provision of a smooth flat surface for attachment of the shoe.

Figure 2:
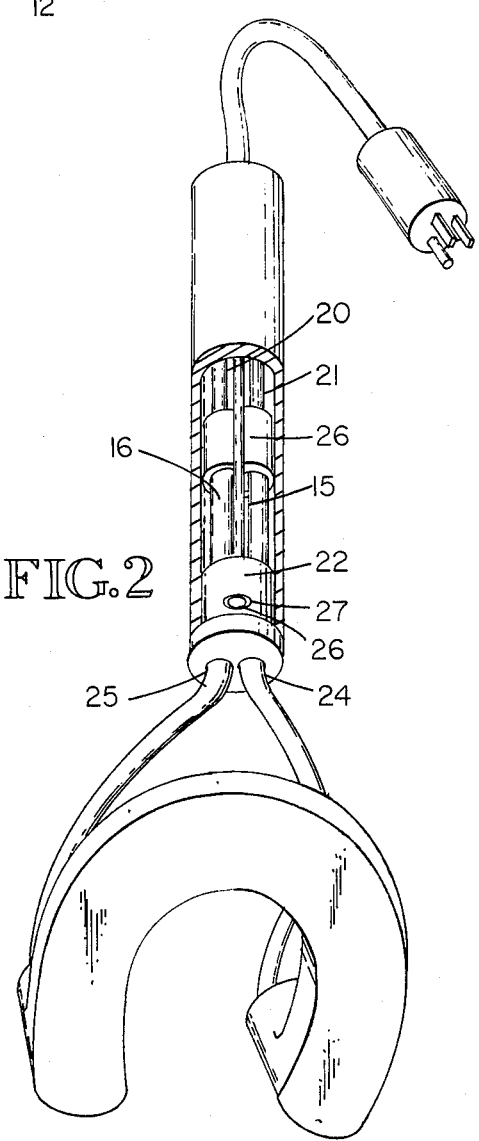
FIG. 2 shows the installation of the heater elements in the handle adapter and the connection of the power wires to the heater elements with the handle partially sectioned.

In FIG. 2 the handle shell 19 is cut away to show (1) the interconnection of ends 15 and 16 of the heater element with the wires 20 and 21 of the power cord and (2) the attachment of the heater element into adapter 22 to which the handle is also attached by set screw 23 24 (FIG. 1). Ends 15 and 16 of the heater element are inserted through holes 24 and 25 and held in place by a 5/16" diameter stainless steel ball (not visible) and a ⅜" diameter, 5/16" long set screw 26 in threaded hole 27 which intersects holes 24 and 25. The ball is pressed against ends 15 and 16 of the heater element. The actual interconnection of the conductor of the heater element and the wires of the power cord are covered by a wrapping 26 of #27½ inch wide glass cloth tape.

Figure 3:
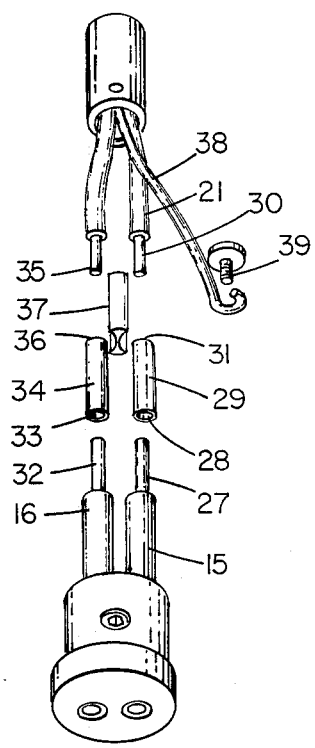
FIG. 3 is an exploded view showing details of the connections of the power wires to the conductors in the heater element.

The components used to make the connections are shown in FIG. 3, an exploded view of the connections. Stripped conductor 27 at end 15 of the heater element fits into end 28 of ferrule 29 and stripped conductor 30 of wire 21 is inserted into end 31 of ferrule 29. The ferrule is then crimped to mechanically and electrically interconnect the conductor inserted into it.

Similarly, stripped conductor 32 at end 16 of the heater element is inserted into end 33 of ferrule 34 and stripped end 35 of wire 20 is inserted into the other end 36 of ferrule 34 which is then crimped to mechanically and electrically connect the conductors inserted into it. A dividing insulator 37 made of Nylon is inserted between the ferrules and the entire connection is wrapped with glass tape as mentioned previously.

The power cord also comprises a ground wire 38 which is connected to adaptor 22 by capscrew 39.

In a preferred embodiment the tubular heater comprises an Incoloy 840 sheathing, a Teco #120 heating wire, Chromal A, with diameter in the range of 0.107 to 0.113 and Rayomet #330 insulation between the sheathing and heating wire. In some instances two heaters may be used and wired identically in parallel.

It is considered to be understandable from the above description that the subject invention meets its objectives. It provides a tool that greatly reduces the vulnerability of cold shod hooves to the deteriorating effects of moisture. It is safe, largely because the heating capacity is not sufficient to melt the bronze working part. It is economical to make and use, not requiring or depending on automatic temperature control. Also, it has been found that training required for its use by experienced farriers is minimal.

It is also considered to be understandable that while one embodiment of the invention is disclosed herein, other embodiments and modifications of the one disclosed are possible within the scope of the invention which is limited only by the attached claims.

I claim:

1. An electrically heated tool for treating the ground contact surfaces of horses's hooves, said tool comprising:
   a generally horseshoe shaped part having a flat working surface,
   means for heating said part to a steady state temperature in the range of 500 degrees F. to 900 degrees F.,
   a handle attached to said part,
   said means for heating being incorporated into said handle and said part.

2. An electrically heated tool for treating the ground contact surface of a horse's hoof, said tool comprising:
   a generally horseshoe shaped part having a flat working surface,
   at least one electrical heating element encased in said part and having first and second element ends extending from said part, said at least one heating element further comprising a conductor having first and second conductor ends and extending through said heating element with said first and second conductor ends extending from said first and second element ends,
   an adaptor,
   a hollow handle,
   a power cord having first and second wires and a ground wire,
   first means for attaching said ground wire to said adaptor,
   second means for attaching said first and second conductor ends to said first and second wires respectively,
   said adaptor having first and second holes for receiving first and second heating element ends and first means for retaining said heating element ends in said first and second holes,
   said handle being adapted to fit over said adaptor and having second means for retaining said handle on said adaptor,
   whereby with (1) said first and second heating element ends inserted through said first and second holes in said adaptor and retained in said adaptor by said first means for retaining, (2) said first and second conductor ends attached to said first and second wires respectively by said second means for attaching, (3) said ground wire attached to said adaptor by said first means for attaching, (4) said power cord passed through said hollow handle and (5) said handle fitted over said adaptor and retained on said adaptor by said second means for retaining, said tool is assembled and ready for use in which said heating element heats said part and said working surface of said part is applied to said ground contact surface of said hoof for 3 to 10 seconds, the heating capacity of said at least one heating element being such that in a steady state heating situation the temperature of said part is in the range of 500° F. to 900° F.

* * * * *